(12) United States Patent
Holly et al.

(10) Patent No.: US 10,045,491 B2
(45) Date of Patent: Aug. 14, 2018

(54) STUMP GRINDING WHEEL WITH REVERSE SPIRAL TEETH

(71) Applicant: Green Manufacturing, Inc., Morenci, MI (US)

(72) Inventors: Brian P. Holly, Onsted, MI (US); Kevin J. Green, Blissfield, MI (US)

(73) Assignee: Green Manufacturing, Inc., Morenci, MI (US)

( * ) Notice: Subject to any disclaimer, the term of this patent is extended or adjusted under 35 U.S.C. 154(b) by 0 days.

(21) Appl. No.: 15/290,113

(22) Filed: Oct. 11, 2016

(65) Prior Publication Data
US 2017/0105365 A1  Apr. 20, 2017

Related U.S. Application Data

(60) Provisional application No. 62/242,151, filed on Oct. 15, 2015.

(51) Int. Cl.
*B27G 13/08* (2006.01)
*A01G 23/06* (2006.01)

(52) U.S. Cl.
CPC .......... *A01G 23/067* (2013.01); *B27G 13/08* (2013.01)

(58) Field of Classification Search
CPC ....... A01G 23/06; A01G 23/067; B27G 13/08
See application file for complete search history.

(56) References Cited

U.S. PATENT DOCUMENTS

| 974,234 | A | | 11/1910 | Burke | |
|---|---|---|---|---|---|
| 3,570,566 | A | * | 3/1971 | McCreery | B27B 5/10 144/176 |
| 3,797,544 | A | * | 3/1974 | Ver Ploeg | A01G 23/067 144/235 |
| 3,935,887 | A | * | 2/1976 | Van Zante | A01G 23/067 144/235 |
| 6,382,277 | B1 | * | 5/2002 | Paumier | A01G 23/067 144/235 |

(Continued)

FOREIGN PATENT DOCUMENTS

KR   20110053057 A   5/2011

OTHER PUBLICATIONS

English Translation of Foreign Patent Document (KR 20110053057 A).

*Primary Examiner* — Shelley Self
*Assistant Examiner* — Smith O Bapthelus
(74) *Attorney, Agent, or Firm* — Endurance Law Group PLC

(57) ABSTRACT

A stump grinding wheel assembly having a disk-like wheel body. A plurality of bilateral mounting stations integral with the wheel body and arranged into spiral cluster groups. Each spiral cluster having an inner mounting station and at least one middle mounting station and an outer mounting station. The inner mounting stations are thicker than the middle mounting stations, which are thicker than the outer mounting stations. A pair of opposing side-cutters are disposed on each left and right side of the mounting stations. A separate plunge-cutter may be included with each spiral cluster. The bilateral mounting stations produce conically-helical cutting paths using identical side-cutters. The unequal width of the inner and middle and outer mounting stations enables better management of cutting forces in side cutting mode, which produces smoother operation.

19 Claims, 9 Drawing Sheets

(56) References Cited

U.S. PATENT DOCUMENTS

| | | | |
|---|---|---|---|
| 6,484,766 B1 | 11/2002 | Falatok et al. | |
| 6,546,977 B1 | 4/2003 | Monyak et al. | |
| 6,708,743 B2 | 3/2004 | Ziehm | |
| 6,712,105 B1 | 3/2004 | Cannon et al. | |
| 7,104,294 B2 | 9/2006 | Kopocs et al. | |
| 7,124,795 B2 | 10/2006 | Kammerer | |
| 7,694,704 B2 * | 4/2010 | Gossett | A01G 23/067 144/218 |
| 7,743,803 B2 | 6/2010 | Paumier | |
| 8,020,591 B2 * | 9/2011 | Kappel | A01G 23/067 144/235 |
| 8,522,843 B2 | 9/2013 | Kappel et al. | |
| 2010/0043922 A1 | 2/2010 | Leonardi et al. | |
| 2014/0338791 A1 | 11/2014 | Green et al. | |
| 2015/0136276 A1 | 5/2015 | Green et al. | |

* cited by examiner

STUMP GRINDING WHEEL WITH REVERSE SPIRAL TEETH

CROSS REFERENCE TO RELATED APPLICATIONS

This application claims priority to Provisional Patent Application No. 62/242,151 filed Oct. 15, 2015, the entire disclosure of which is hereby incorporated by reference and relied upon.

BACKGROUND OF THE INVENTION

Field of the Invention

The present invention relates generally to a stump grinding apparatus and, more specifically, to a stump grinding apparatus having a rotating wheel fitted with replaceable cutters.

Description of Related Art

A typical stump cutting or stump grinding apparatus includes a plurality of cutting teeth or tips mounted to a rotatable cutting wheel. The wheel is supported for rotation about a horizontal axis at relatively high speed at the end of a boom. When moved into position facing an unwanted tree stump, the boom together with the rotating wheel is swung side-to-side in a wide oscillating arc causing the individual cutting tips to grind and chip away the stump.

In the process of grinding away a tree stump below the surface of the surrounding grade, the cutting tips are driven into unknown perils for edged cutting tools including dirt and rocks and buried foreign objects and such. As would be expected, the cutting tips wear quickly due to the harsh operating environment, and are therefore typically held in serviceable tool holders, which are sometimes referred to in the trade as pockets or mounting blocks. Moreover, the tool holders also wear out and must be replaced often. Changing cutting tips and tool holders is not only expensive for operators, but also time consuming. Reducing the time and/or effort needed to service a stump cutting apparatus increases the overall benefits to an operator.

Despite the many recent advances in this art, many of which have been conceived and patented by the Applicant of this present invention, there exists need for improvements in at least three areas: serviceability, cutting efficiency and vibration reduction. The need for improved cutting efficiency is closely linked to the concept of driving power. Due to the characteristically low cutting efficiency of modern stump grinding systems, relatively large engines are needed to rotate the cutting wheel with sufficient torque and speed. Larger engines are expensive, heavy and consume large quantities of fuel. Stump grinding is an inherently rough, coarse operation. Tree stumps are often very hard, and/or non-uniform in hardness especially below the soil line. Rocks and other foreign objects are often embedded in the stump at or below the soil line as well. Cutting tips dull quickly. These factors contribute to a typically rough and jarring grinding experience. As a direct result, the machinery, components and fittings must all be made especially robust to withstand the typically difficult operating conditions. However, robust machinery, components and fittings are expensive and heavy, which in turn demand larger engines and more expensive/heavier equipment.

There have emerged many unique theories toward improving cutting efficiency. Some of these theories could not withstand the test of time, and are no longer practiced. Some theories, on the other hand, are based on insightful concepts but are hindered due to impractical elements in the initial designs. For example, U.S. Pat. No. 3,570,566 to McCreery describes a stump-grinding wheel having groups or clusters of side-cutting tips set in inward spirals. Each spiral cluster is composed of four or five spike-like teeth, each held in respective tool holders. The tool holders within each spiral cluster are all different sizes to position the cutting tip in a conical pattern. McCreery's concept of side-cutting tips set in inward spirals on the wheel body is insightful, however several inherent drawbacks have prevented this concept from gaining widespread commercial acceptable.

One drawback of the McCreey design relates to serviceability. The fact that the tool holders within each spiral group are all different sizes poses a serious burden to the operator, in that they must have on hand spares for each size tool holder which, in the case of McCreery's disclosed examples, will mean at least five different size tool holders. Having this many spares on hand is expensive and creates some inventory management burdens that many operators are loath to undertake. Furthermore, the numerous different size tool holders pose an opportunity installation errors. If the wrong size tool holder is installed in the wrong position on McCreery's wheel, it may go unnoticed until the wheel assembly is put into operation. A substantial decrease in grinding efficiency could be expected, together with accelerated wear and very likely accentuated vibration/chatter.

Another downside to McCreery's disclosed wheel concept is the failure to anticipate and remediate an inherent vibration/chatter caused by the positioning of the cutting tips in a conically-spiraling pattern. Because each cutting tip is laterally offset from the rotating plane of the wheel body, a bending moment is created in the wheel body in reaction to the cutting tip interacting with the stationary tree stump. The further the cutting tip is offset from the rotary plane of the wheel body, the greater its bending moment. It therefore follows that the bending moment generated at the innermost cutting tips is greater than the bending moments created any of the other cutting tips. In fact, within each spiral cluster, McCreery's cutting tips all produce different/unique bending moments. Consequently, the rapidly rotating wheel body being subjected to all these dissimilar forces begins to vibrate and chatter excessively, resulting in poor cutting performance and aggravation to the operator and accelerated wear and tear on all of the machinery.

There is therefore a need for a stump grinding system that has improved cutting performance using conically spiral clusters of cutting tips, but that produces less chatter/vibration and is relatively easy/inexpensive to maintain.

BRIEF SUMMARY OF THE INVENTION

According to a first aspect of this invention, a stump grinding wheel is provided of the type that is rotated at high speed to grind away an earth-rooted tree stump. The wheel comprises a wheel body that is configured for rotation in a cutting direction about a rotational axis that passes centrally therethrough. The wheel body is parsable (contemplatively) into a plurality of segments radiating from the rotational axis wherein each segment occupies a predetermined angular portion of annular geometry. The wheel body has a left side and a right side. A plurality of bilateral mounting stations are distributed about the wheel body. Each mounting station has a left pad on the left side and an axially opposite right pad on the right side. The mounting stations are arranged into spiral clusters. At least one, but preferably only one, spiral cluster is disposed in each respective segment. The spiral clusters comprise, at least, an inner mounting station and a middle mounting station and an outer mounting station. The inner mounting station in each spiral cluster is located radially proximate to the rotational axis relative to the middle and outer mounting stations. The outer mounting station in each spiral cluster is located radially remote from the rotational axis relative to the inner and middle mounting stations. And the axial distance between the left and right pads of the inner mounting stations is greater than the axial distance between the left and right pads of the inner mounting stations. The axial distance between the left and right pads of the middle mounting stations is greater than the axial distance between the left and right pads of the outer mounting stations. As a result of the unequal widths of the inner and middle and outer mounting stations, the cutting forces can be better managed in side cutting mode. The net effect for a user is smoother operation while grinding away a tree stump.

According to a second aspect of this invention, a stump grinding wheel assembly is provided of the type that is rotated at high speed to grind away an earth-rooted tree stump. The assembly includes a wheel body configured for rotation in a cutting direction about a rotational axis passing centrally therethrough. The wheel body is parsable into a plurality of segments radiating from the rotational axis, wherein each segment occupies a predetermined angular portion of annular geometry. The wheel body has a left side and a right side. A plurality of bilateral mounting stations are distributed about the wheel body. Each mounting station has a left pad on the left side and an axially opposite right pad on the right side. The plurality of mounting stations are arranged into a plurality of spiral clusters equal in number to the plurality of segments. Each spiral cluster is disposed in a respective one of the segments. Each spiral cluster comprises an inner mounting station and at least one middle mounting station and an outer mounting station. The inner mounting stations are located radially proximate to the rotational axis relative to the middle and outer mounting stations. The outer mounting stations are located radially remote from the rotational axis relative to the inner and middle mounting stations. A side-cutter disposed on each of the left and right pads. Each side-cutter operatively faces into the cutting direction. The axial distance between the left and right pads of the inner mounting stations is greater than the axial distance between the left and right pads of the inner mounting stations. The axial distance between the left and right pads of the middle mounting stations is greater than the axial distance between the left and right pads of the outer mounting stations. The unequal width of the inner and middle and outer mounting stations enables better management of cutting forces in side cutting mode, which in turn results in smoother operation.

The bilateral mounting stations of varying thicknesses function to moderate the reaction forces within the wheel body, thus lessening vibration in use. The bilateral mounting stations are also effective to produce conically-helical cutting paths using identical side-cutters, thus facilitating maintenance and parts replacement activities for the average user.

BRIEF DESCRIPTION OF THE SEVERAL
VIEWS OF THE DRAWINGS

These and other features and advantages of the present invention will become more readily appreciated when considered in connection with the following detailed description and appended drawings, wherein.

DETAILED DESCRIPTION OF THE
INVENTION

Figure 1A:
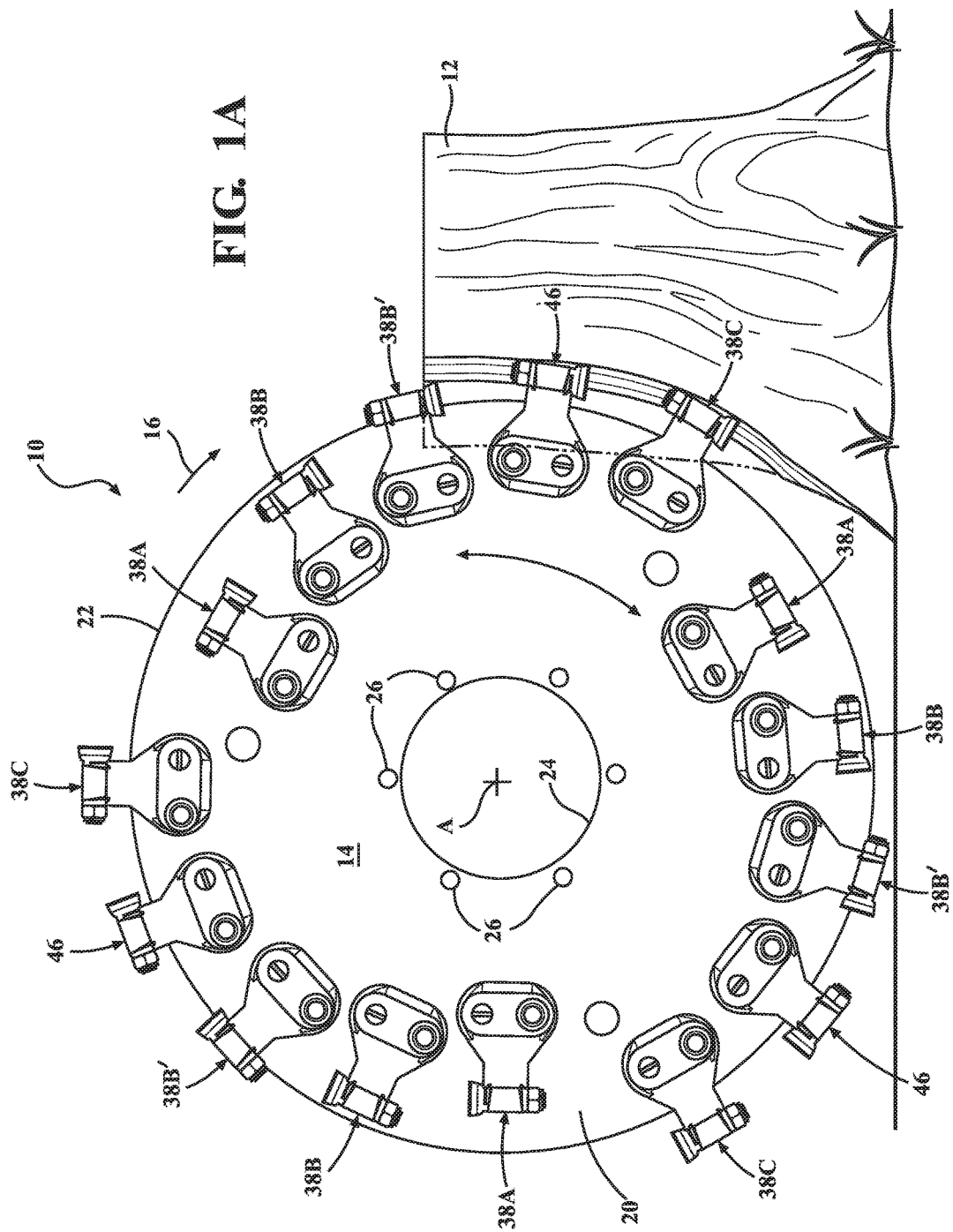
FIG. 1A is a simplified side view of a stump grinding wheel assembly according to one embodiment of the invention in the process of grinding away an earth-rooted tree stump.
Figure 1B:
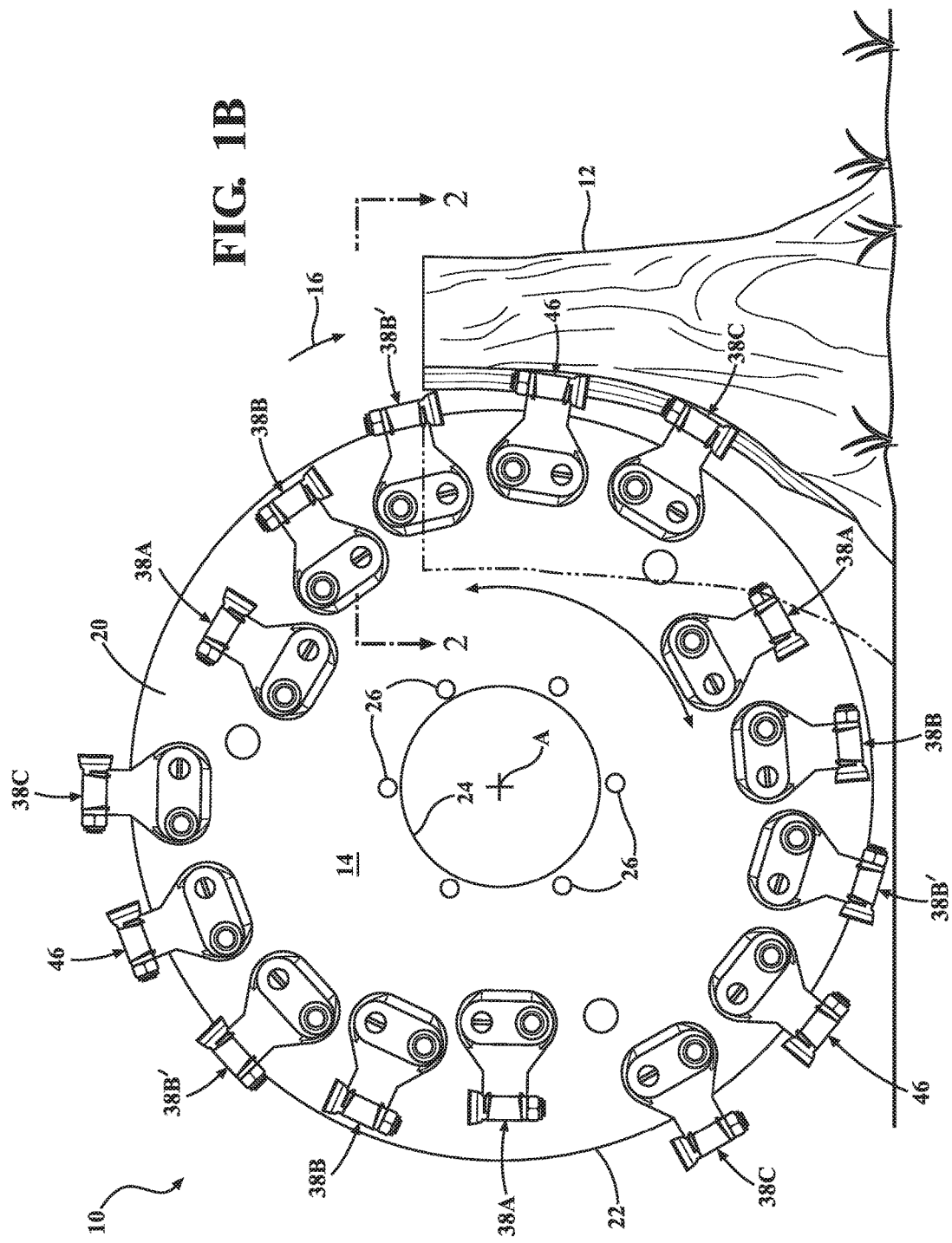
FIG. 1B is a side view as in FIG. 1 but showing a further progression of the grinding operation wherein the cutting arc is substantially longer and foreseeably affects the operation of the assembly.
Figure 2:
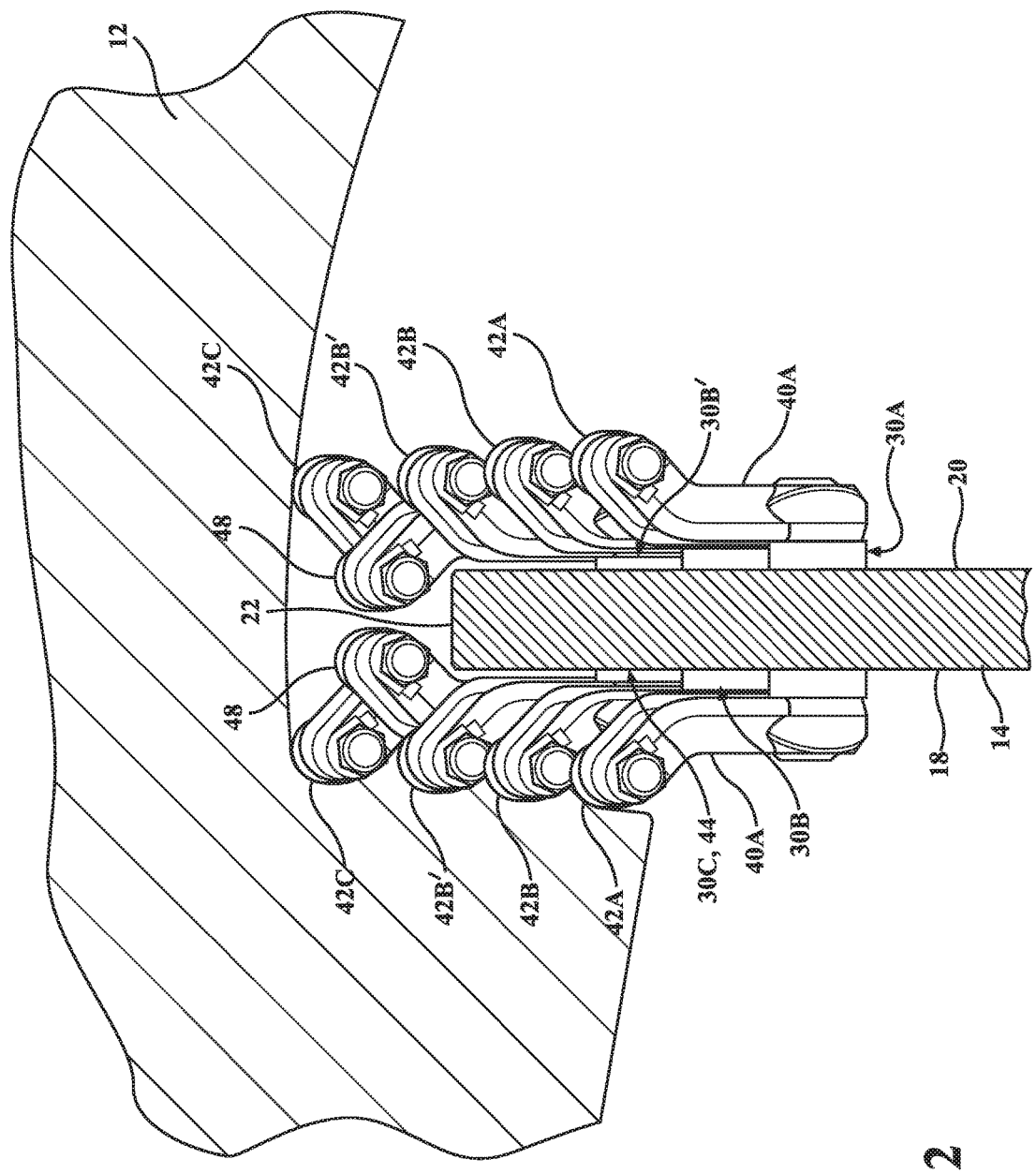
FIG. 2 is a cross-section view as taken generally along lines 2-2 in FIG. 1B, but has been distorted for clarity to show the several tool holders in a spiral cluster as stacked one upon the other so as to emphasize their relative positions on the wheel body.

Referring to the figures, wherein like numerals indicate like or corresponding parts throughout the several views, a stump grinding wheel assembly is generally shown at 10. The assembly 10 is of the type intended to be fitted to the rotary output shaft of a standard stump grinding machine (not shown). In use, the wheel assembly 10 is rotated by the grinding machine at high speed, and then lowered into an earth-rooted tree stump 12 to progressively grind away its exposed portion as depicted in FIG. 1A. Typically, as shown in FIG. 1B, the stump 12 is taken down to a few inches (centimeters) below the ground surface in an attempt to remove all visual traces of the stump 12 from the landscape.

Turning now to FIGS. 2-6, the assembly 10 is shown including a wheel body 14 according to a first embodiment of the invention. The wheel body 14 is specifically configured for power-driven rotation in a cutting direction 16 about a rotational axis A. The rotational axis A passes centrally through the wheel body 14. The cutting direction 16 is typically "over the top" as can be discerned from FIGS. 1A and 1B so that cutting debris is forced down and rearward. That is to say, when viewed from the right-hand side perspective as in FIGS. 1A and 1B, the cutting direction 16 is clockwise. However, is it possible that the cutting direction 16 is opposite, lifting the cutting debris upwardly. Regardless, the cutting direction 16 defines a forward angular direction for the wheel body 14 which understanding will be pertinent to describing other features of the wheel assembly 10 below.

Figure 5:
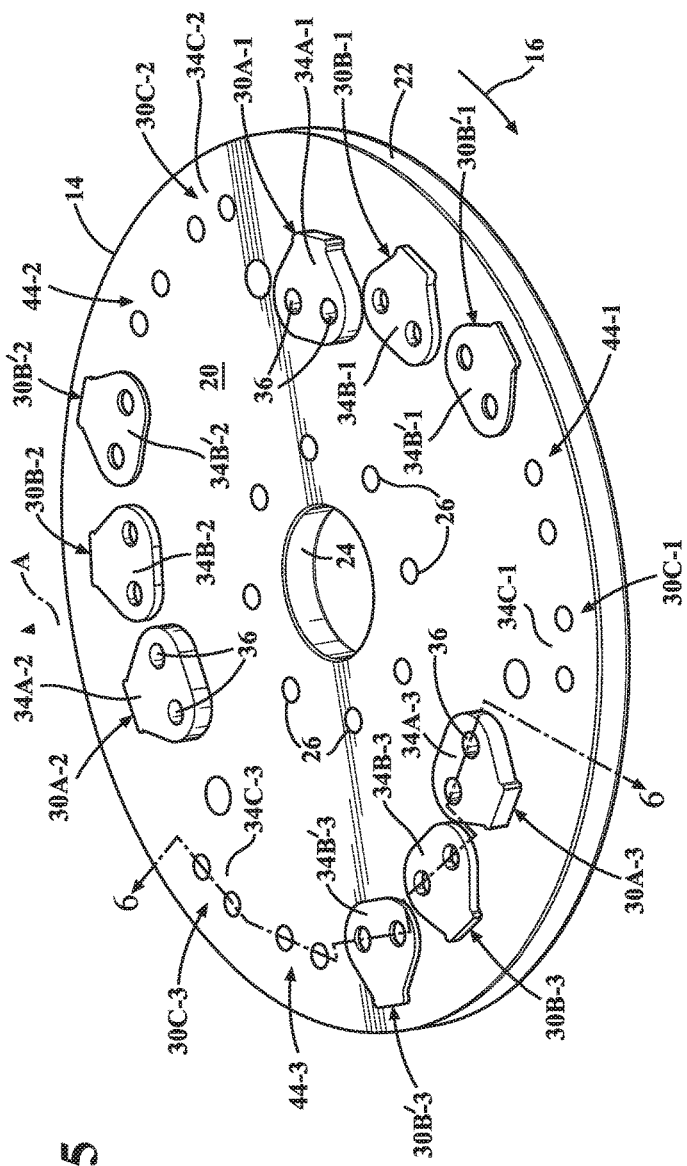
FIG. 5 is a perspective view of a wheel body showing the several mounting stations on one side thereof.
Figure 6:
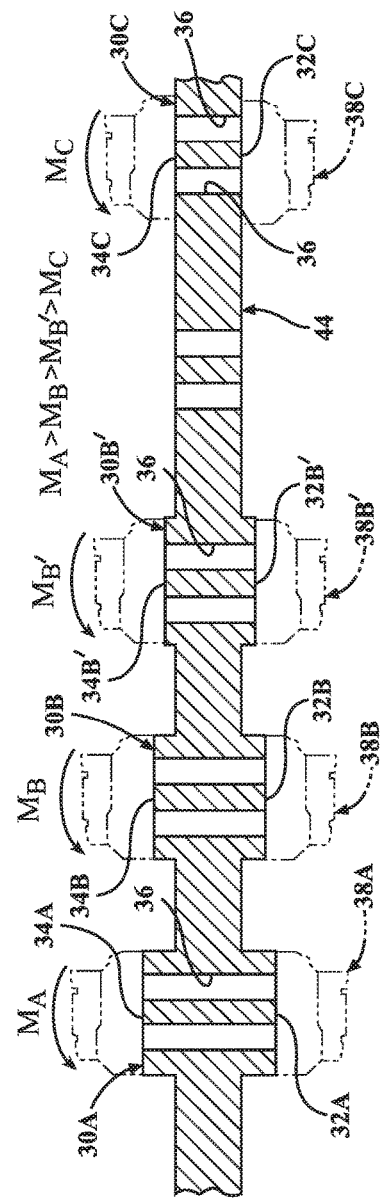
FIG. 6 is a cross-sectional view taken generally along lines 6-6 in FIG. 5, in which the relative axial thicknesses of the several mounting stations within a given segment are displayed for comparative value.

The wheel body 14 is shown by itself in FIGS. 5 and 6 having a plate-like appearance. In this example, the wheel body 14 is shaped like a disk or annulus having a circular or generally circular periphery 22. In some alternative configurations however, a non-circular periphery could be employed. The wheel body 14 is fabricated from a durable material such as steel, although other materials and material alloys may be possible. The wheel body 14 can be seen having a left side 18 and a right side 20. The left 18 and right 20 sides are generally planar surfaces which, in the illustrated examples, are disposed parallel to one another and generally perpendicular to the rotational axis A. When rotated at high speed about the rotational axis A, the wheel body 14 is preferably rotationally stable with little to no detectable imbalance. In many cases, the grinding machine will have a rotary spindle or output shaft (not shown) to which the wheel body 14 is attached via a central hub opening 24. The central hub opening 24 is depicted as being circular and centered about the rotational axis A, however a spline-like configuration is also possible. A plurality of apertures 26 are disposed in a predetermined pattern about the central hub opening 24. The apertures 26 are adapted to receive bolts (not shown) to attached the wheel body 14 to the rotary spindle of the grinding machine in well-known fashion.

Figure 3:
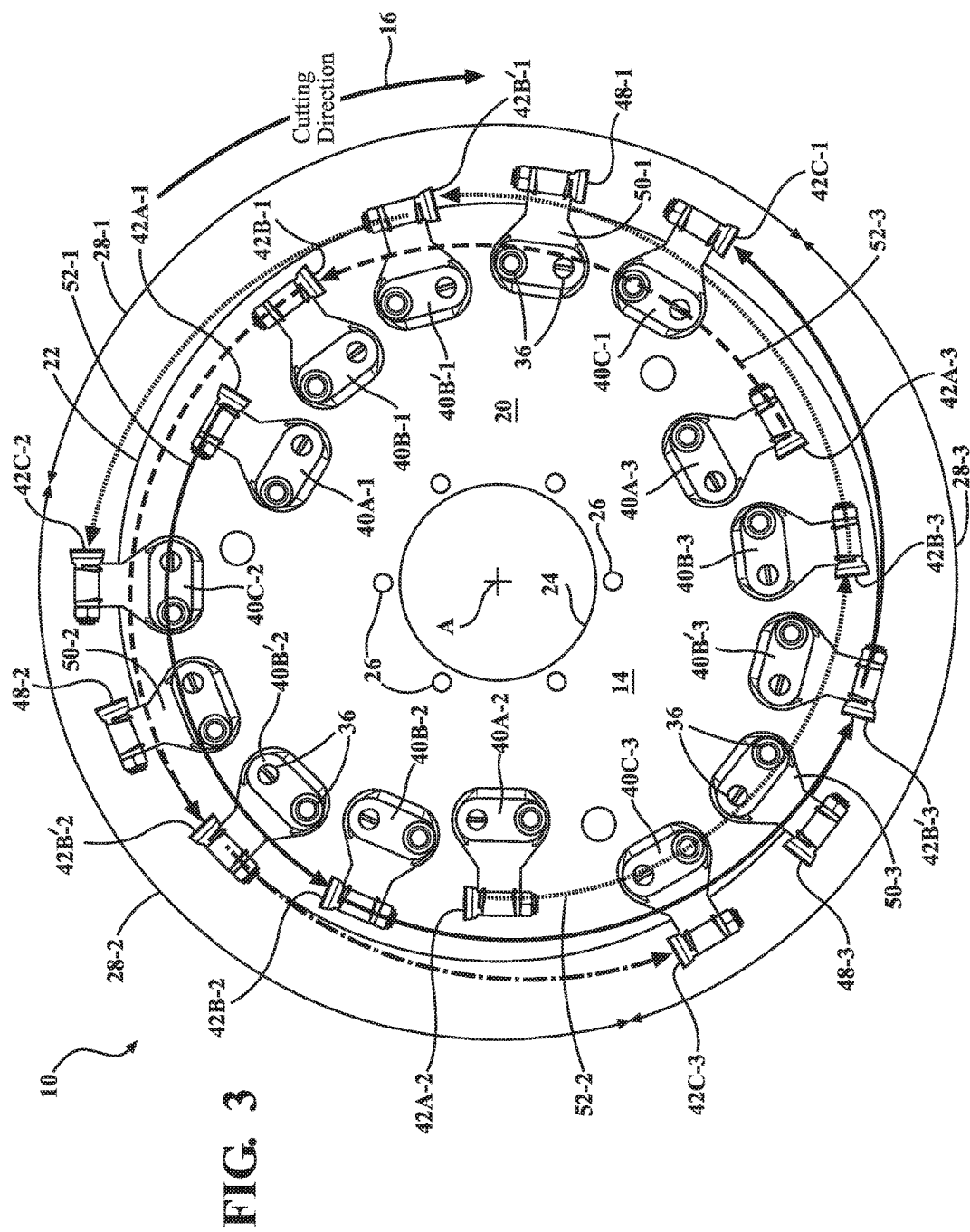
FIG. 3 is a right side view of the wheel assembly of the preceding figures illustrating the three superimposed reverse-spiral cutting paths/sequences produced thereby.
Figure 4:
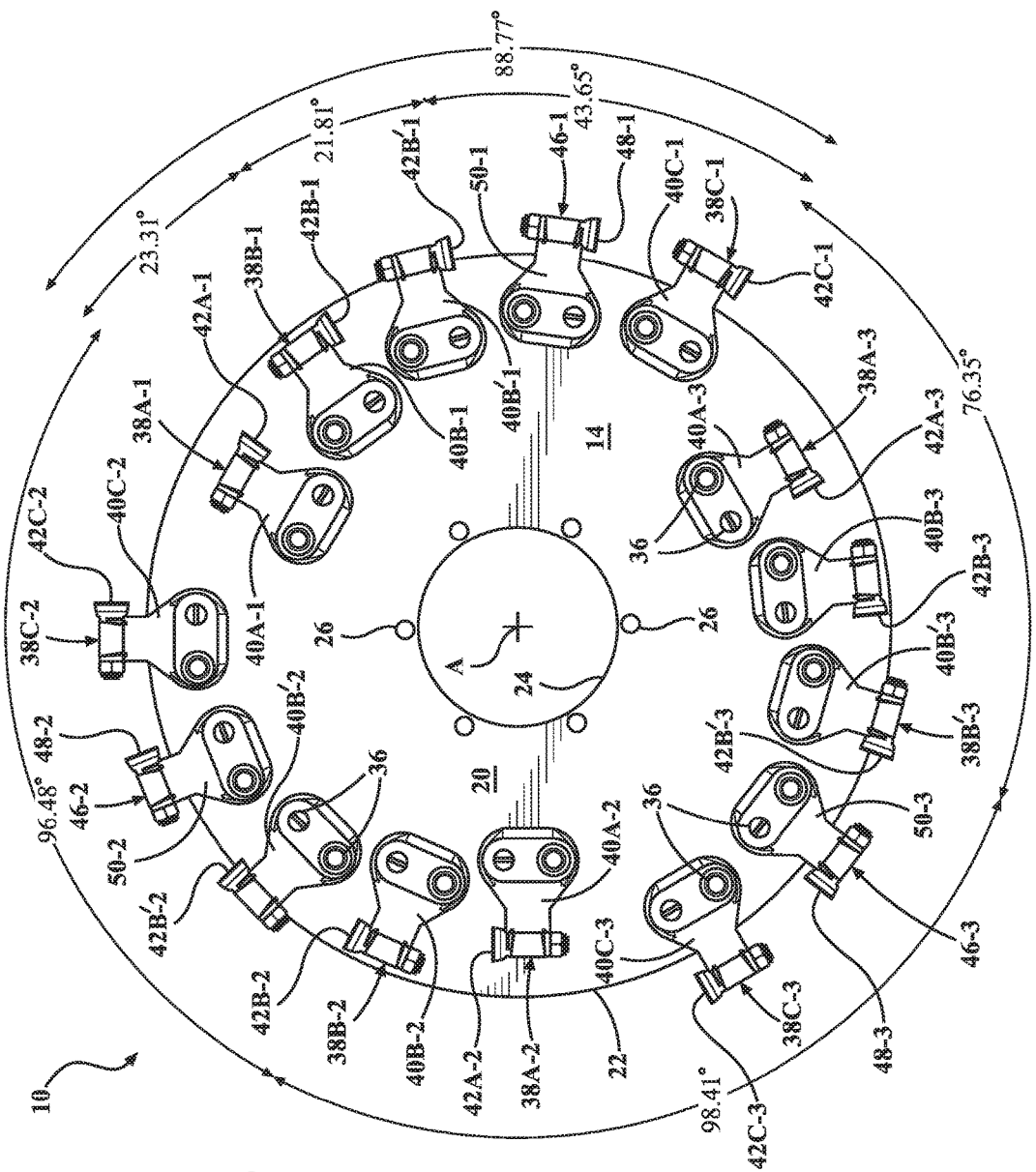
FIG. 4 is a right side view as in FIG. 3 but showing an exemplary configuration by providing angular dimensions between certain of the cutting tips.

Turning now to FIGS. 3 and 4, it can be observed that the wheel body 14 is parsable into a plurality of segments 28 radiating from the rotational axis A. That is to say, the wheel body 14 can be viewed, or contemplated, as a having or being divisible into constituent parts. These constituent parts, i.e., the segments 28, are not necessarily mechanically separable from one another, but rather naturally identifiable as distinct regions of the wheel body 14. Each segment 28 occupies a predetermined angular portion of annular geometry, which takes the geometric shape of a pie wedge or a sector of an annulus. The segments 28 are all contiguous and non-overlapping, such that the angular sum of all the segments 28 equals 360 degrees (or $2\pi$ radians). Preferably, the number of segments 28 for the wheel body 14 comprises between two and about six segments 28, and more preferably still between three and four segments 28 of generally equal angular measure. That is to say, the segments 28 are preferably all equal in size, however it is possible that the segments 28 could be unequal in angular measure. For example, in a case where the wheel body 14 has four segments 28, the angular measure of two diametrically opposed segments could each be 105° and the angular measure of the other two could each be 75°. More typically, however, the wheel body 14 will be fashioned with either three segments 28 of 120° each or four segments 28 of 90° each. Larger diameter wheel bodies 14 will tend toward more segments 28 whereas smaller diameter wheel bodies 14 will tend to have fewer segments 28. All of the illustrated examples depict wheel bodies 14 composed of three segments 28 of equal angular measure (i.e., 120°).

A plurality of bilateral mounting stations, generally indicated at 30, are distributed about the wheel body 14. The mounting stations 30 are deemed bilateral, in that they are two-sided, having operative features presenting on both the left 18 and right 20 sides of the wheel body 14. These mounting stations 30 are preferably, but not necessarily, integral monolithic formations together with the wheel body 14, as perhaps best seen in the cross-sectional view of FIG. 6. From a manufacturing point of view, the integral nature of the mounting stations 30 can be accomplished by casting or forging or machining the wheel body 14 with mounting stations 30 in situ from a homogeneous stock. Alternatively, the mounting stations 30 could be fixedly attached in a subsequent operation such as by welding or bolting or otherwise securely coupling pieces of suitable material (e.g., steel plates) onto the respective left 18 and right 20 sides of the wheel body 14.

Each mounting station 30 can be seen having a left pad 32 on the left side 18 of the wheel body 14, and an axially opposite right pad 34 on the right side 20 of the wheel body 14. In this manner, the left 32 and right 34 pads can be considered mirror images of one another. A perpendicular plane bisecting the wheel body 14 thus divides the mounting stations 30 into left and right halves on the respective left 18 and right 20 sides thereof. This perpendicular plane could also be referred to as the rotary plane of the wheel body 14. The left 32 and right 34 pads are illustrated as being generally planar, i.e., flat, however non-flat configurations are also contemplated. As clearly visible in FIG. 6, the left 32 and right 34 pads are disposed parallel to one another, and generally perpendicular to the rotational axis A. That is, the flat surfaces of the left 32 and right 34 pads are each parallel to the aforementioned perpendicular plane bisecting the wheel body 14 into substantially equal left and right halves. Each mounting station 30 includes at least one, but more typically two (and possibly more), apertures 36 for the purpose of securing a cutting tool to each pad 32, 34 as will be described more fully below. In the illustrated examples, the apertures 36 are pass-through, meaning that they extend fully between the respective left 32 and right 34 pads, as shown in FIG. 6. However, in some alternative configurations the one or more apertures 36 may be stopped so as not to pass through the wheel body 14. For pass-through apertures 36, it is preferable to form them axially through the wheel body 14, i.e., normal to the aforementioned rotary plane that bisects the wheel body 14 into substantially equal left and right halves.

Figure 7:
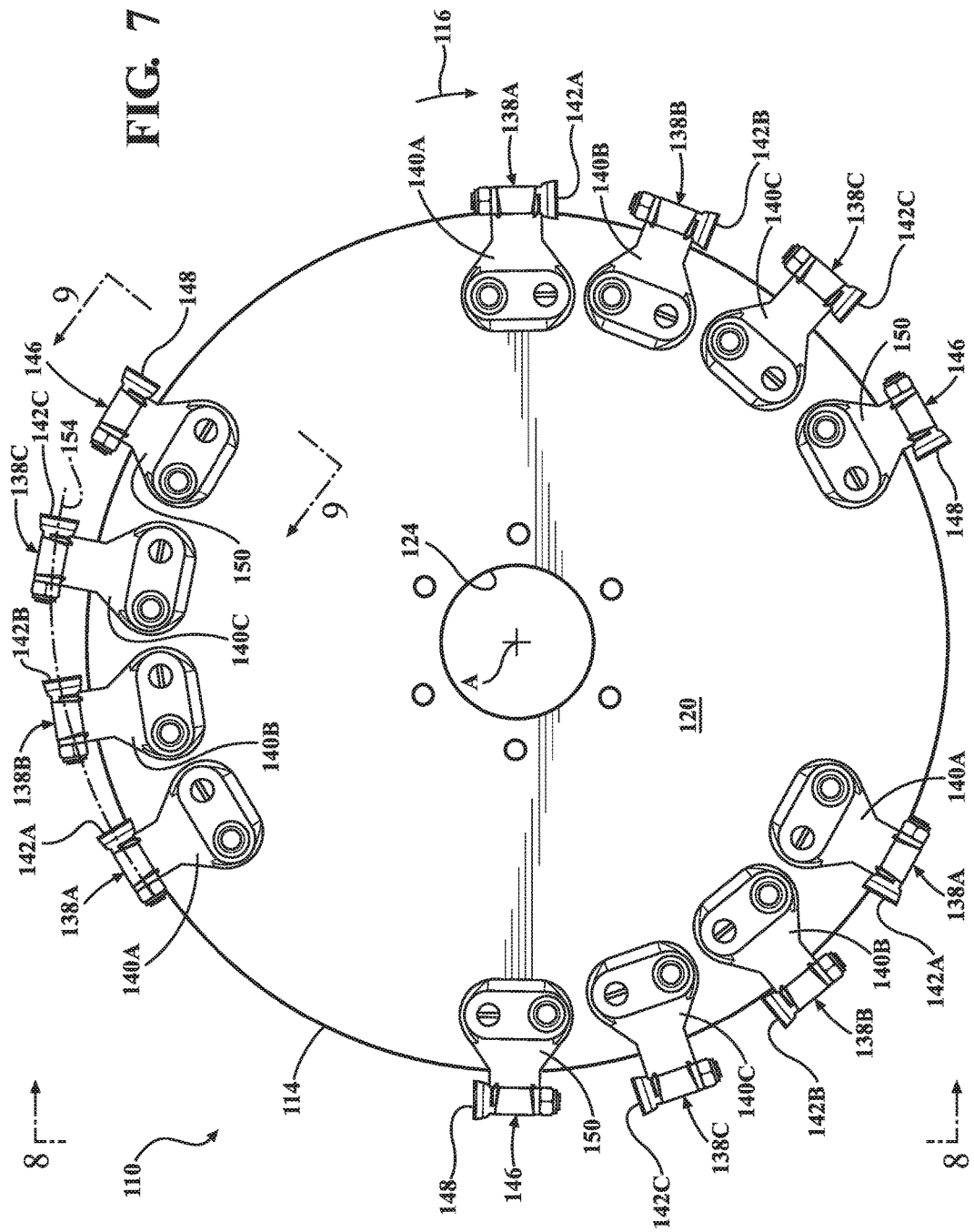
FIG. 7 is side elevation of an alternative embodiment of the wheel assembly.
Figure 8:
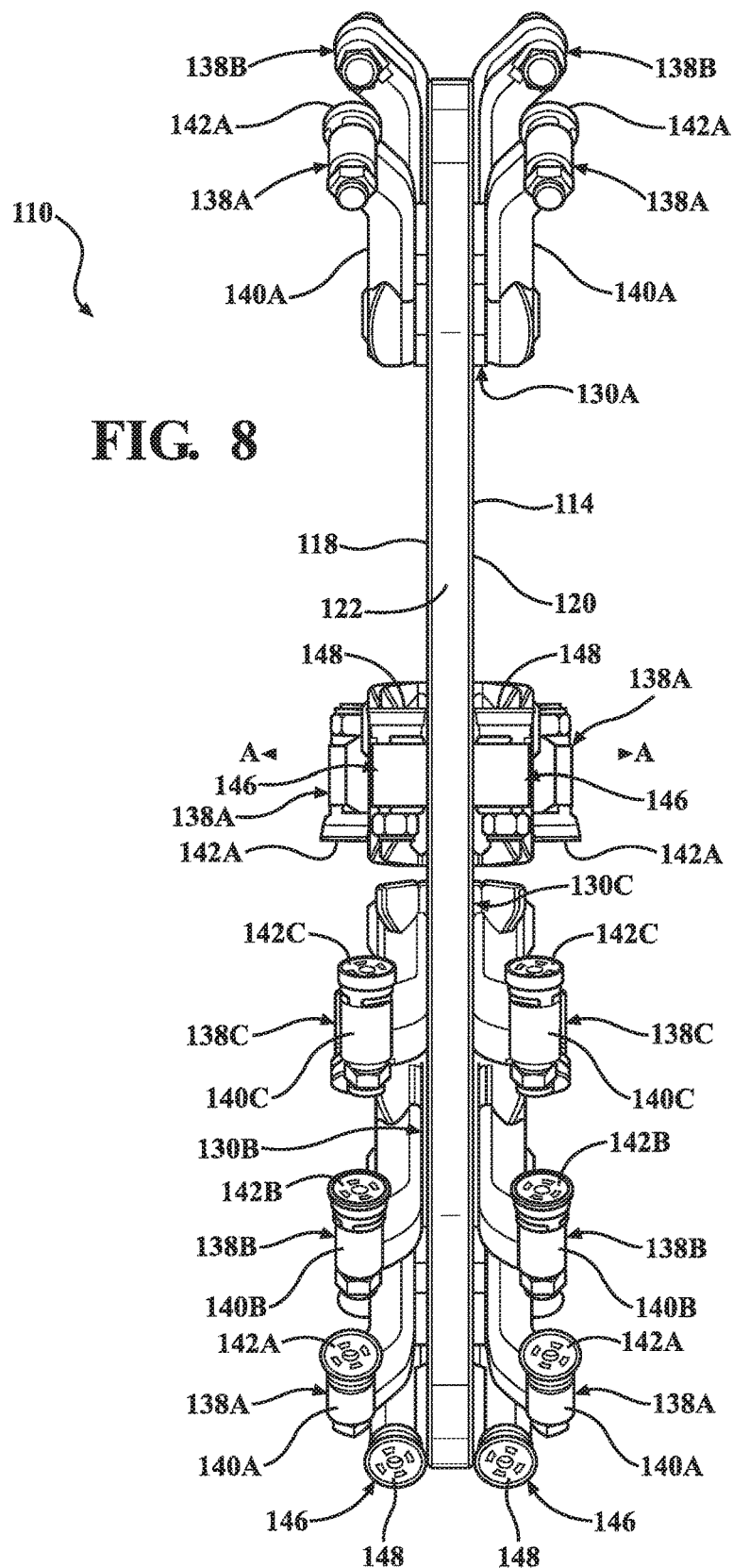
FIG. 8 is an end view as taken generally along lines 8-8 of FIG. 7.
Figure 9:
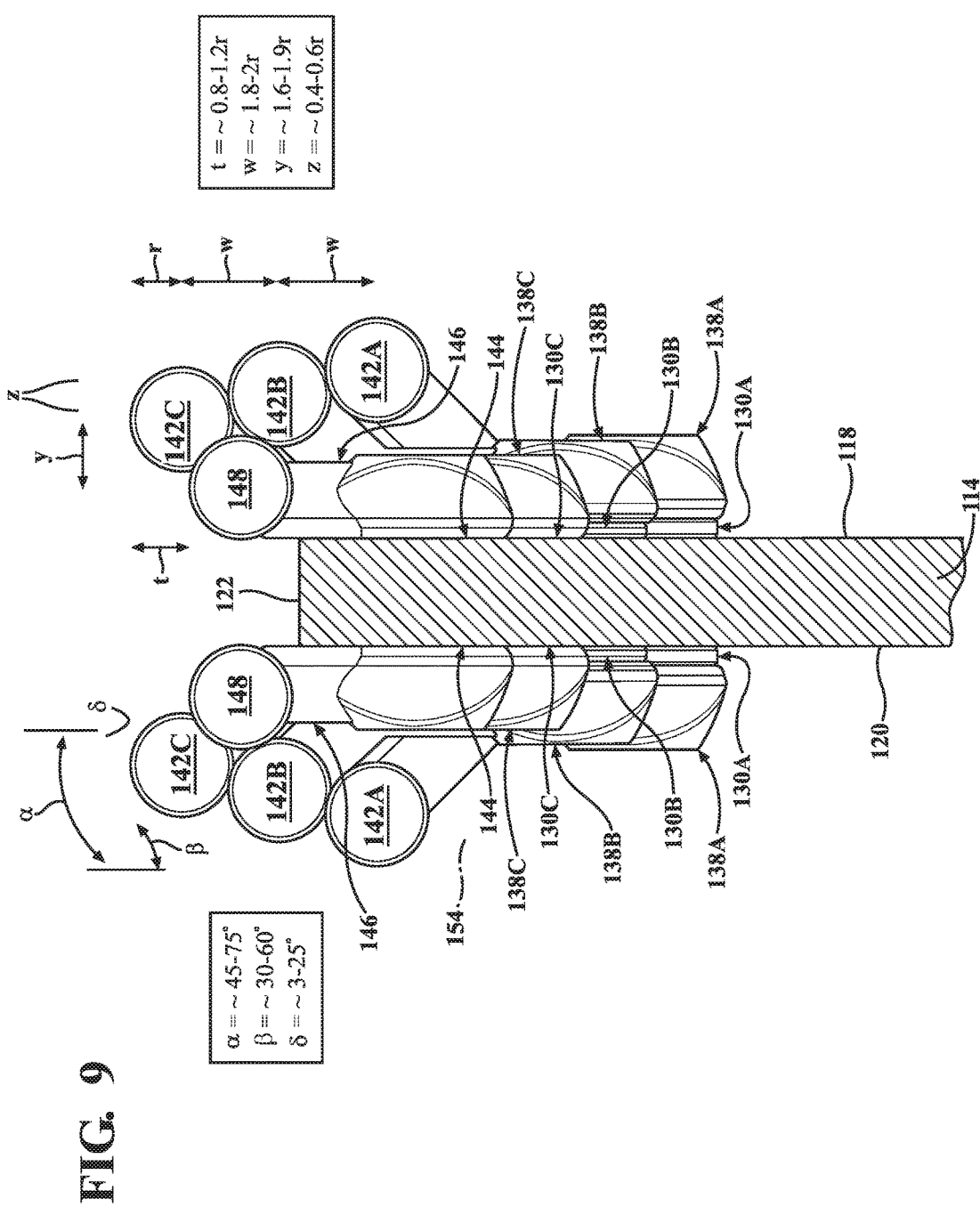
FIG. 9 is cross-sectional view taken generally along lines 8-8 of FIG. 7 which, as in FIG. 2, is distorted to show the several tool holders within the same spiral cluster as if stacked one upon the other to better discern their relative positions on the wheel body.

The previously introduced concept of parsing the geometry of the wheel body 14 into segments 28 is relevant in relation to the strategic locations or placements of the individual mounting stations 30. In particular, the mounting stations 30 are arranged on the wheel body 14 into spiral clusters. Each spiral cluster contains a plurality of mounting stations 30. In the embodiment of FIGS. 1A-6, there are five mounting stations 30 per spiral cluster. FIGS. 7-9 depict an example where there are only four mounting stations 30 per spiral cluster. Three mounting stations 30 per spiral cluster would generally be considered a minimum number to constitute a spiral pattern. There are a plural number of spiral clusters. Preferably, although not necessarily, the number of spiral clusters is equal in number to the plurality of segments 28. That is to say, one spiral cluster for each segment 28. So, if a wheel body 14 is comprised of three segments 28, there are three spiral clusters; if the wheel body 14 has six segments 28 there are six spiral clusters; and so forth. It is possible that there could, in some instances, be two or more spiral clusters in a segment 28. It is also possible that there could exist a segment 28 without any spiral clusters contained therein. Furthermore, it is possible that the spiral clusters need not all be identical. That is, in a four segment wheel body 14, two of the segments 28 might have spiral clusters composed of four mounting stations 30 each and the other two segments 28 could have spiral clusters composed of three mounting stations 30 each. Nevertheless, in the illustrated examples each segment 28 includes one and only one spiral cluster of mounting stations 30 and all have an identical number of mounting stations 30.

In all cases, each spiral cluster comprises an inner mounting station 30A and at least one middle mounting station 30B and an outer mounting station 30C. The inner 30A, middle 30B and an outer 30C mounting stations are each different on the basis of their radial position relative to the rotational axis A and their angular position with respect to one another. When traced in progression from one to the next, like stars in a constellation, these mounting stations 30A, 30B, 30C can be seen to lay along a spiral path having its origin at or near the rotational axis A, and hence they are described as being arranged in a spiral cluster.

The inner mounting stations 30A are distinguished from the middle 30B and outer 30C mounting stations as being located radially proximate to the rotational axis A. That is, the inner mounting stations 30A are closer (radially) to the rotational axis A than any of the middle 30B and outer 30C mounting stations. The outer mounting stations 30C are distinguished from the inner 30A and middle 30B mounting stations as being located radially remote from the rotational axis A. Said another way, the outer mounting stations 30C are farthest (radially) from the rotational axis A relative to the inner 30A and middle 30B mounting stations. It can therefore be deduced that the middle mounting stations 30B in each spiral cluster are located radially in-between the inner 30A and outer 30C mounting stations.

In many contemplated cases, a wheel body 14 will be configured with more than one set of middle mounting stations 30B. This is shown, for example, in FIGS. 1A-6, where two middle mounting stations 30B, 30B' are depicted. In this case, the middle mounting station closer to the rotational axis A is identified by reference number 30B and the middle mounting station farther from the rotational axis A is identified by reference number 30B'. Preferably, in each spiral cluster, the one or more middle mounting stations 30B, 30B', etc., are located radially with respect from one another so as to more or less equally divide the radial distance between the inner 30A and outer 30C mounting stations. If for example the radial distance between the inner 30A and outer 30C mounting stations is 30 mm, and if there are provided two middle mounting stations 30B and 30B', then: the radial distance between the inner 30A and first middle 30B mounting stations would be 10 mm; the radial distance between the first 30B and second 30B' middle mounting stations would be 10 mm; and likewise, the radial distance between the second middle mounting station 30B' and the outer mounting station 30C would also be 10 mm. In a different example, if the radial distance between the inner 30A and outer 30C mounting stations is 30 mm, and if there is only one middle mounting station 30B, then: the radial distances between the inner 30A/middle 30B and middle 30B/outer 30C mounting stations would be 15 mm and 15 mm, respectively.

Angularly, the inner mounting station 30A occupies the rearward-most position in each spiral cluster. To be clear, rearward is defined with respect to the cutting direction. Rearward is away from the cutting direction and forward is into the cutting direction. When the cutting direction is seen as clockwise, as from the perspective of FIG. 3, the rearward-most position within each segment 28 refers to the mounting station 30A in that segment 28 that occupies the counterclockwise-most location of any of the mounting stations 30. Thus, within each spiral cluster, the inner mounting station 30A is located angularly rearwardly relative to the positions of the middle 30B and outer 30C mounting stations. In contrast, the outer mounting station 30C within each spiral cluster is located angularly forwardly relative to the inner 30A and middle 30B mounting stations in the same spiral cluster. And the one or more middle mounting stations 30B, 30B', etc., are disposed circumferentially in-between the inner 30A and outer 30C mounting stations.

In addition to location (i.e., placement) differences, the inner 30A, middle 30B and outer 30C mounting stations are distinctive in their axial thicknesses. As best seen in FIGS. 5 and 6, the axial distance between the left 32A and right 34A pads of the inner mounting stations 30A is greater than the axial distance between the left 32B, 32B' and right 34B, 34B' pads of the middle mounting stations 30B, 30B'. And, the axial distance between the left 32B, 32B' and right 34B, 34B' pads of the middle mounting stations 30B, 30B' is greater than the axial distance between the left 32C and right 34C pads of the outer mounting stations 30C. Simply put, the wheel body 14 is thickest at the inner mounting stations 30A and thinnest at the outer mounting stations 30C. Intermediate thicknesses are found at the one or more middle mounting stations 30B, 30B', etc.

The effect of these mounting stations 30 arranged in spiral clusters of progressively varying thicknesses may be likened to a stair step like configuration where the pads 32, 34 are like the treads. Moving up the steps, as it were, from the outer mounting station 30C within a sector 28 leads on an inward-winding spiral course toward the inner mounting station 30A. This analogy may be best appreciated from the perspective of FIG. 5.

The primary purpose of the mounting stations 30 is to support a pair of side-cutters, generally indicated at 38, in opposing fashion. One side-cutter 38 is disposed on the left pad 32 and the other side-cutter 38 is attached to the right pad 34, so that each mounting station 30 supports two side-cutters 38. The side-cutters 38 are, preferably, all identical to one another, and each are oriented on the respective pads 32, 34 so that they operatively face into the cutting direction 16. When the wheel assembly 10 is rotated at high speed, as in FIGS. 1A and 1B, the side-cutters 38 chip and gnaw away at the tree stump 12 transforming the once solid tree stump 12 into loose shavings.

The side-cutters 38 can take many different forms, including but not limited to those described in the Applicant's US 2016/0270307 published Sep. 22, 2016 and US 2014/0338791 published Nov. 20, 2014, the entire disclosures of which are hereby incorporated by reference and relied upon. Each side-cutter 38 includes a tool holder 40 configured for direct attachment to a left 32 or right 34 pad of the associated mounting station 30. The tool holder 40 supports a cutting tip 42, which is a wear part desired for regular adjustment or replacement. The cutting tips 42 can take many different forms, including but not limited to the form described in the aforementioned US 2016/0270307, which shows the cutting tip having a generally circular shape and designed to be periodically rotated to expose a fresh cutting edge when needed.

Each tool holder 40 includes holes adapted to align with the pass-through apertures 26 in the mounting stations 30. A threaded fastener may be disposed in each hole and the corresponding pass-through apertures 26 as a means for securing the pair of opposing tool holders 40 to each of the left and right sides of the bilateral mounting stations 30. The holes in the tool holders 40 may be configured with one and a clearance hole and the other a tapped hole. Threaded fasteners may thus be inserted from opposite sides of the wheel body 14 to operatively engage the respective tool holders 40 on the opposing left 32 and right 34 pads of each mounting station 30.

Optionally, one or more of the spiral clusters may include a bilateral auxiliary mounting station 44 for attaching a plunge cutter, generally indicated at 46. The purpose of the plunge cutter is to cut into the tree stump 12 when the rotating wheel assembly 10 is plunged straight into the truck 12 as opposed to the more typical side-to-side swinging motion. Each plunge-cutter 46, therefore, supports a cutting tip 48 that, at least partially, overlies the periphery 22 of the wheel body 14. The tool holder 50 portion of the plunge-cutter 46 can either have a uniquely straight shape (see #150 in FIG. 9) or be formed by a side-cutter of the aforementioned variety that has been reverse-mounted to its pad 32, 34 so that the cutting tip 48 more substantially extends over the periphery 22 of wheel body as in the example of FIG. 2.

Like the other mounting stations 30, the one or more auxiliary mounting stations 44 are defined in terms of their radial position and their angular position (within each segment 28) and their axial thickness. Radially, the auxiliary mounting stations 44 are located near the periphery 22, typically equal to or approximately equal to the radial positions of the outer mounting stations 30C. The auxiliary mounting stations 44 preferably have an axial width equal to or generally equal to the axial width of the outer mounting stations 30C. I.e., the auxiliary mounting stations 44 are narrower than any of the inner 30A and middle 30B, 30B' mounting stations.

Within each segment 28, the auxiliary mounting station 44 may be angularly located at the forward most end of the spiral cluster, i.e., in a lead position in the cutting group, or may be located at the rearward most end of the spiral cluster, i.e., in a trailing position in the cutting group. More preferably, however, the auxiliary mounting station 44 is disposed in the midst of the side-cutters 38 in each spiral cluster. That is to say, particularly favorable results have been achieved when the plunge-cutter(s) 46 is disposed angularly in-between the inner 30A and outer 30C mounting stations. More preferably still, the opposing pair of plunge-cutters 46 on each auxiliary mounting station 44 are located between the last middle mounting station 30B' and the outer mounting station 30C within each spiral cluster. This is perhaps best shown in FIGS. 3 and 4.

The angular placement of the mounting stations 30 may be strategically designed to optimize performance of the wheel assembly 10. In the side view of FIG. 3, there is shown a wheel body 14 having three segments 28 of equal angular measure (i.e., 120 degrees each). The segments 28 will be referred to as first, second and third segments. There is one spiral cluster in each segment 28. The spiral clusters are identical in each segment 28. Each spiral cluster includes four identical side-cutting tool holders 40 and one plunge-cutting tool holder 50. Each component and element in the first segment 28 is identified by the suffix "-1," each component/element in the second segment 28 is identified by the suffix "-2," and each feature in the third segment 28 is identified by the suffix "-3." In this manner, the first segment 28-1 is composed of an inner mounting station 30A-1, a first middle mounting station 30B-1, a second middle mounting station 30B'-1, an auxiliary mounting station 44-1, and an outer mounting station 30C-1. Continuing in this example of the first segment 28-1, the inner mounting station 30A-1 has a left pad 32A-1 and a right pad 34A-1. And so forth.

In use, the wheel body 14 is mounted for power-driven rotation on the articulated boom of a stump grinding machine, in well-known fashion. The boom (not shown) is swept in a horizontal, raking path across a tree stump 12 to be removed, so that the cutting tips 42 on the side-cutting tool holders 40 each cut and chip away at the wooden stump 12. At the end of each sweep, the wheel body 14 is lowered and then swept in the opposite direction. In this way, the tree stump 12 is incrementally ground away using primarily only the cutting tips 42 of the side-cutting tool holders 40. The cutting tips 48 of the plunge-cutting tool holders 50 are employed little if at all in the typical stump grinding operation.

The configuration of the wheel body 14 is particularly advantageous as providing a stump grinding wheel assembly that can quickly and efficiently grind away a tree stump 12 consuming a minimum amount of energy and producing a minimum amount of vibration/chatter. This in turn enables use of a smaller driving engine and lighter-duty machinery. More specifically, the configuration and arrangement of the mounting stations 30 enable the side-cutting tool holders 40 to establish reverse spiral engagement sequences for the cutting tips 42. Moreover, the bilateral mounting stations 30, of various axial thicknesses, are believed to contribute to smooth performance. In particular, the integrated mounting stations 30 are thought to disturb the natural resonance of the wheel body 14, thereby helping to attenuate vibrations/chatter in use. The vibration attenuating effect may be enhanced by the unequal width of the inner 30A and middle 30B, 30B', etc. and outer 30C mounting stations enabling better management of cutting forces in a side cutting mode. Better force management would naturally result in smoother operation.

This latter observation may be best understood in reference to FIG. 6, in which side-cutters 38 are shown in phantom positions on the respective pads 32, 34 of the mounting stations 30A-30C. Because the cutting tip 42 of each side-cutter 38 is laterally offset from the rotating plane of the wheel body 14, a bending moment M is created in reaction to the edge of the cutting tip 42 interacting with the stationary tree stump 12. The further the cutting tip 42 is away from the rotary plane of the wheel body 14, the greater its moment M. (A bending moment can be computed by multiplying the reaction force and perpendicular distance from the rotary plane of the wheel body 14.) Thus, the moment $M_A$ generated at the inner cutting tip 42A is greater than the moment $M_B$ created at the first middle cutting tip 42B. And it follows that $M_A > M_B > M_{B'} > M_C$. Advantageously, the axial thicknesses of the mounting stations 30A-30A also follow a similar pattern, where the thickness of the inner mounting station 30A is greater than the thickness of the first middle mounting station 30B, which is thicker than the second middle mounting station 30B', and so on. Consequently, the locations that experience the greatest moments ($M_A$) correspond with those portions of the wheel body 14 which are the stiffest and most able to resist the moments—namely the inner mounting stations 30A. And, the localized moment resistance ability (i.e., stiffness in specific places) of the wheel body 14 decreases in proportion with the decrease in moments from $M_B$ to $M_{B'}$ to $M_C$.

Thus, the bilateral mounting stations 30 of varying thicknesses function to moderate the reaction forces within the wheel body 14, which is believed to result in less vibration of the assembly 10 in use. And furthermore, the bilateral mounting stations 30 produce the previously described conically-helical cutting paths 52 using identical side-cutters 38. That is to say, the conical, spiral cutting paths 52 can be achieved using fully interchangeable tool holders 40 and cutting tips 42 at all of the mounting stations 30. Of course, the use of identical side-cutters 38 makes maintenance and parts replacements substantially easier for users, and reduces inventory pressures on manufactures and retailers.

The reverse spiral pattern is graphically illustrated in FIG. 3 by way of three discrete reverse-spiral cutting paths 52-1, 52-2 and 52-3. Each cutting path 52-1, 52-2, 52-3 is, in fact, slightly conical as well as spiral, thus existing in helically spiral three-dimensional form. Because the cutting tips 42 in the inner tool holders 40A-1, 40A-2 and 40A-3 have the greatest lateral offset from the side faces 18, 20 of the wheel body 14 (due to their thick inner mounting stations 30A), these are the first or leading edges to begin cutting on a side sweeping rake of the wheel body 14. The cutting path 52-1 associated with the first segment 28-1 is initiated by the inner tool holder 40A-1. The cutting path 52-2 associated with the second segment 28-2 is initiated by the inner tool holder 40A-2. And the cutting path 52-3 associated with the third segment 28-3 is initiated by the inner tool holder 40A-3.

The cutting path 52-1 may be described as follows. In typical use or operation, the rotating wheel assembly 10 is advanced into the tree stump 12 with a raking (side-swinging) motion so that the side-cutters 38 do most of the work. The cutting tip 42A-1 of the tool holder 40A-1 on the first mounting station 30A-1 in the first segment 28-1 can thus be seen to strike first as it stands most proud from the side 18, 20 of the wheel body 14. However, the inner tool holder 40A-1 is also set very low (radially speaking) on the wheel body 14, such that the cutting tip 42B-2 of the first middle tool holder 40B-2 in the second segment 28-2 is next to make contact, which contact strikes and clears the groove a little bit deeper yet closer to the rotary plane of the wheel body 14. With further rotation of the wheel body 14, the cutting tip 42B'-3 of the second middle tool holder 40B'-3 in the third segment 28-3 strikes the wood stump 12 and continues clearing a groove that is deeper and yet closer still to the rotary plane of the wheel body 14. Finally, the cutting tip 42C-1 of the outer tool holder 40C-1 in the first segment 28-1 engages the tree stump 12 to extend the groove to its maximum depth and closest point to the plane of the wheel body 14. This sequence describes the first conical reverse-spiral cutting path 52-1.

As can be followed in the diagrams of FIG. 3, similar reverse-conical cutting paths 52-2 and 52-3 are thus concurrently accomplished as all of the side cutting tips 42 engage the stump 12. Cutting tip 42 strikes are made to occur in regular patterns that begin at the most radially inward and laterally distant inner tool holders 40A-1, 40A-2 and 40A-3, and then progress radially outwardly and laterally inwardly (toward the rotary plane of the wheel body 14). As a result, in operation the wheel assembly 10 produces three distinct, yet closely nested cutting paths 52-1, 52-2, 52-3 that eat away at the tree stump 12. It should be noted that the number of spiral clusters determines the number of cutting paths 52. So, a wheel body 14 having four spiral clusters will produce four cutting paths 52, six spiral clusters will produce six cutting paths 52, and so forth.

Close inspection of the cutting paths 52-1, 52-2 and 52-3 thus reveals three discrete conically converging reverse-spirals. In almost counter-intuitive fashion, each arcuate cutting path 52-1, 52-2, 52-3 expands (radially outwardly) as the cut progresses from A to B to B' to C, but also recedes laterally (i.e., into the sweeping direction of the wheel body 14). Because of the radially expanding positions, each successive cutting tip 42 has a higher linear (tangential) velocity than that of the preceding cutting tip 42 along the path 52-1, 52-2 and 52-3. This results in a remarkably even distribution or balancing of cutting forces about the circumference of the wheel body 14, which in turn leads to a substantial reduction in vibration/chatter. Furthermore, the radially expanding arcuate cutting paths 52-1, 52-2, 52-3 combined with the laterally receding position of the cutting tips 42 in each cutting path 52-1, 52-2, 52-3 results in a very efficient cutting regime that transforms a wooden tree stump 12 into uniformly curled wood shavings using minimal driving energy.

As will be described more fully below, it is a distinct object of this invention to understand the engagement sequence of cutting tips along these cutting paths 52-1, 52-2, 52-3 as a tree stump is being ground away, and to control the arcuate spacing of the cutting tips along each cutting path 52-1, 52-2, 52-3 for maximum cutting effectiveness. Depending on the OEM design of the machine to which the wheel body 14 is attached, the circumference of the wheel body 14, and hence the circumference at the outermost cutting tips 42C, may vary from relatively small to relatively large. Therefore, for smaller diameter wheel bodies 14, it may be desirable to establish only two spiral clusters (each residing within a segment 28 of 180 degrees) so that the cutting tips 42 can be adequately spaced to maintain a relatively large cutting arc even when deeply advanced into a large tree stump 12. On the other hand, for larger diameter wheel bodies 14, it may be desirable to establish four or more spiral clusters wherein the cutting tips 42 can be adequately circumferentially spaced apart from one another.

In use, the wheel body 14 is rotated about its rotational axis A while being swept back-and-forth side-to-side in descending increments across a tree stump 12. In this embodiment, the cutting tips 48 of the tool holders 50 are used only for plunge cutting. The arrangement of the four side-cutting tool holders 40A, 40B, 40C and 40D within each sector 28 maintains the afore-mentioned reverse spiral engagement sequence for the respective cutting tips 42A, 42B, 42C and 42D that produce beneficial results.

FIG. 4 is a view of the wheel body 14 as in FIG. 3, and illustrates the arcuate distance between cutting tips 42 in the sequence of the first cutting path 52-1. In this example, the arcuate distance between cutting tips 42A-1 and 42B-2 is 96.48 degrees. The arcuate distance between cutting tips 42B-2 and 42B'-3 is 98.41 degrees. The arcuate distance between cutting tips 42B'-3 and 42C-1 is 76.35 degrees. This leaves a remainder of 88.77 degrees to complete the circle, which is the arcuate distance between the outer cutting tip 42C-1 and the starting point of the cutting path 52-1 at cutting tip 42A-1. The present invention seeks to maximize the arc between each tool holder 40 in a cutting sequence. In other words, attempts are made to establish as wide and uniform arcuate spacing as possible between the cutting tips 42 along each cutting path 52-1, 52-2, 52-3. In the given example the spacings are: 96.48°-98.41°-76.35°[-88.77°]. It will be understood that, in this example, the arcuate distances between cutting tips 42 in the other cutting paths 52-2 and 52-3 are substantially identical, and furthermore that the angular distances described above are variable according to application and/or design preference.

FIG. 4 also illustrates the arcuate distance between cutting tips 42 within a common segment 28. In this example, the first segment 28-1 is specified, it being understood that the other segments 28-2 and 28-3 will be similar. Here, the arcuate distance between the inner 42A-1 and first middle 42B-1 cutting tips is 23.31 degrees. The arcuate distance between first middle 42B-1 and second middle 42B'-1 cutting tips is 21.81 degrees. The arcuate distance between second middle 42B'-1 and outer 42C-1 cutting tips is 43.65 degrees. In this case, a plunge-cutter 46 is located between the second middle 42B'-1 and outer 42C-1 cutting tips, thus approximately doubling the arcuate span between these two side-cutters 38. It will be understood that the angular distances described here are for examples only to illustrate the generally uniform arcuate distributions with a scheme where there are three spiral clusters each composed of four side-cutters 38 and with one interleaved plunge-cutter 46. Of course, the angular measures can be variable according to application and/or design preference.

A comparison of FIGS. 1A and 1B illustrates how the arcuate length of the cutting paths 52-1, 52-2, 52-3 increases as the wheel body 14 advances into a tree stump 12. For large tree stumps 12, the arcuate length of the cutting paths 52-1, 52-2, 52-3 can become very long. In order to achieve the aforementioned goal of requiring minimal driving energy (e.g., horsepower) to grind away the tree stump 12, it is an object of this invention to establish the positions of the tool holders 40 so that the fewest number of cutting tips 42 are engaging the tree stump 12 (along the cutting paths 52-1, 52-2, 52-3) at any one time. This becomes more challenging as the wheel body 14 moves deeper into the cut and the arcuate length of the cutting paths 52-1, 52-2, 52-3 increases.

As mentioned earlier, it is advantageous to limit how many cutting tips 42 are likely to be active in a cut at one time by maximizing the arc between each tool holder 40 in a cutting sequence. That is to say, by design intention the arcuate spacing of the cutting tips 42 along each cutting path 52-1, 52-2, 52-3 is preferably established for optimal cutting efficiency. For smaller diameter cutting wheels 200, only two spiral clusters/segments 28 may be employed so that the cutting tips 42 can be adequately spaced apart when the wheel assembly 10 is deeply advanced into a large tree stump 12. For larger diameter cutting wheel assemblies 10, the designer has greater flexibility and may, if desired, establish three or four or more spiral clusters/segments 28.

Upon consideration of FIGS. 3 and 4, it will become apparent that a relatively uniform distribution of cutting tips 42 has been achieved about the circumference of the wheel body 14. This well-balanced distribution, with maximized individual cutting arcs, in combination with the other factors described above, contributes to regulation of the cutting forces as the wheel body 14 is operated to grind away tree stumps 12.

As mentioned previously, the advantages of the configuration and arrangement of the bilateral mounting stations 30, of various axial thicknesses, can be applied across a wide range of wheel body 14 diameters and applications. FIGS. 7-9, for example, illustrate another embodiment of the present invention in which each spiral cluster is comprised of three mounting stations 130A, 130B and 130C, each with corresponding pairs of side-cutters 138A, 138B, 138C. For convenience, the previously established reference numbers have been offset by 100 when referring to the alternative embodiment of FIGS. 7-9. In this variation, the spiral clusters contain only one middle mounting station 130B disposed generally mid-way—both radially and angularly—between the inner 130A and outer 130B mounting stations. Even so, because the mounting stations 130A-130C of different thicknesses are integrated with the wheel body 114 as described above, they disturb the natural resonance of the wheel body 114 to help attenuate vibrations/chatter. And also, the unequal width of the monolithic mounting stations 130A-130C enables better management of cutting forces (i.e., resistance to bending moments M) in the side cutting mode. That is, the inner mounting stations 130A experience the greatest moments ($M_A$) and are the stiffest, and the localized stiffness of the wheel body 114 at the other mounting stations 130B and 130C corresponds in proportion to the decreases in their respective moments ($M_B$, $M_C$).

In each spiral cluster, the inner tool holders 140A are located closest to the rotational center A of the wheel body 114. These inner tool holders 140A support cutting tips 142A at radial positions recessed below the outer periphery 122 of the wheel body 114, as shown in FIG. 9. In the illustrated example, the geometric centers of the circular cutting tips 142A for the inner tool holders 140A may be located less than the measure "w" from the outer circumference of the wheel body 114, where "w" is ~1.2-2 r, and "r" is the radius of the circular cutting tips 142. In other embodiments with more than three side-cutters 138 per spiral cluster, however, the inner tool holders may be set >w below the periphery 122. The inner tool holder 140A in each spiral cluster is also located laterally the farthest from the side surfaces 118, 120 of the wheel body 114, which is accomplished by the relatively thick inner mounting stations 130A. In the illustrated embodiments, the geometric centers of the circular cutting tips 142A for the inner tool holders 140A are laterally offset from the side face 118, 120 of the wheel body 114 approximately r+y+2z, where "y" is ~1.6-1.9 r and "z" is ~0.4-0.6 r. However, other lateral offsets are possible. The lateral offset of the inner mounting stations 130A from each of the left and right sides 118, 120 are approximately 2z. The total axial thickness of the inner mounting stations is thus approximately 4z+the base thickness of wheel body 114.

In each spiral cluster, the middle tool holder 140B is located farther from the rotational center A of the wheel body 114 than the middle tool holder 140A. That is to say, the middle mounting stations 130B are closer to the periphery 122 of the wheel body 114 than are the inner mounting stations 130A. The radial location of the middle tool holders 140B are determined according to application, but as shown in this example can be set so that their respective cutting tips 142B are exposed above the periphery 122 of the wheel body 114. In FIG. 9, for example, the geometric centers of the circular cutting tips 142B for the middle tool holders 140B are located at or slightly above the periphery 122. More particularly, the radial distance between the centers of the inner cutting tips 142A and the middle cutting tips 142B is shown to be about "w," however other dimensions and proportions are certainly possible. The middle tool holder 140B in each spiral cluster is also offset laterally from the side 118, 120 of the wheel body 114 by a distance of approximately z, resulting in a similar lateral offset of z between the centers of the inner 142A and middle 142B cutting tips. In the illustrated embodiments, the geometric centers of the circular cutting tips 142B for the middle tool holders 140B are laterally offset from the sides 118, 120 of the cutting wheel 114 approximately r+y+z.

In each spiral cluster, the outer tool holder 140C is located farthest from the rotational center A of the wheel body 114 supports cutting tips 142C that are fully exposed above the periphery 122 of the wheel body 114. In the illustrated embodiments, the geometric centers of the circular cutting tips for the outer tool holders 140C are located above the centers of the middle cutting tips 142B by about "w." The outer tool holder 140C in each spiral cluster is also located laterally from the side surfaces of the wheel body 114, but typically its outer mounting station 130C has a thickness equal to the base thickness of wheel body 14. In the example depicted in FIG. 9, the geometric centers of the circular cutting tips 142C for the outer tool holders 140C are laterally offset from the sides 118, 120 of the wheel body 114 approximately r+y.

The three side-cutting tool holders 140A, 140B and 140 C in each spiral cluster are thus arranged so the geometric centers of the circular cutting tips 142 (within the group) are located along a conically spiraling offset 154, which is shown from different perspectives in FIGS. 7 and 9. (This spiraling offset 154 pertains specifically to the cutting tips within each spiral cluster, and is not to be confused with the cutting paths 52 described above.) When viewed from the vantage of FIG. 9, the spiral offset 154 displays a divergent angle "δ" when measured from a side 118, 120 of the wheel body 114. Preferably, the divergent angle "δ" is between about 3-25°. More preferably, the divergent angle "δ" is between about 5-10°. In the illustrated examples, the divergent angle "δ" is between 7° and 8°.

One plunge-cutter 146 in each spiral cluster is shown in FIGS. 7-9 located as the first or lead tool holder 150, rather than in-between the outer 40C and middle 40B' tool holders in the embodiment of FIGS. 1A-6. Of course, this lead position for the auxiliary mounting station 144 is interchangeable with the outer tool holder 140C in each respective spiral cluster, as its thickness and radial locations are the same as that of the outer mounting station 130C. That is to say, in another contemplated embodiment (not shown), the plunge tool holders 150 may be mounted to the wheel body 114 arcuately in-between the middle 140B and outer 140C tool holders instead of in a leading position as is illustrated in FIGS. 7 and 8.

The cutting tips 148 of the plunge tool holders 150 are fully exposed above the periphery 122 of the wheel body 114, as shown in FIG. 9. Because the plunge tool holders 150 are straight (i.e., not inwardly angled), the plunge cutting tips 148 are located practically tangent to the sides 118, 120 of the wheel body 114. In other words, the geometric centers of the circular cutting tips 148 for the plunge tool holders 150 are laterally offset from the sides 118, 120 approximately r. In the radial direction, the uppermost edges of the circular cutting tips 148 for the plunge tool holders 150 are located below the geometric centers of the outer cutting tips 142C by about "t" amount, where "t" is ~0.8-1.2 r.

As mentioned above, the straight plunge tool holders 150 in some or all of the spiral clusters could be replaced by reverse-mounted angled tool holders like that used for the side-cutters 138, consistent with the examples described in connection with FIGS. 1A-6. In this case, the uppermost edges of the circular cutting tips 148 for the plunge tool holders 150 could be located below the geometric centers of the outer cutting tips 142C by an amount less than "t" but greater than zero.

The plunge tool holder 150 is preferably located so that the geometric center of its circular cutting tip 148 lays along a convergent angle "β" As measured from the sides 118, 120 of the wheel body 114, the convergent angle "β" is between about 30-60°. Or as measured from the divergent angle "δ," the geometric center of the plunge cutting tip 148 lies along a conically spiraling angle "α" which is between about 45-75°. These angular relationships are depicted in FIG. 9.

The foregoing invention has been described in accordance with the relevant legal standards, thus the description is exemplary rather than limiting in nature. Variations and modifications to the disclosed embodiment may become apparent to those skilled in the art and fall within the scope of the invention. Furthermore, particular features of one embodiment can replace corresponding features in another embodiment or can supplement other embodiments unless otherwise indicated by the drawings or this specification.

What is claimed is:

1. A stump grinding wheel assembly of the type rotated at high speed to grind away an earth-rooted tree stump, said assembly comprising:
   a wheel body configured for rotation in a cutting direction about a rotational axis passing centrally therethrough, said wheel body being parsable into a plurality of segments radiating from said rotational axis wherein each segment occupies a predetermined angular portion of annular geometry, said wheel body having a left side and a right side,
   a plurality of bilateral mounting stations distributed about said wheel body, each said mounting station having a left pad on said left side and an axially opposite right pad on said right side, said plurality of mounting stations being arranged into a plurality of spiral clusters equal in number to said plurality of segments, each said spiral cluster being disposed in a respective one of said segments, each said spiral cluster comprising an inner mounting station and at least one middle mounting station and an outer mounting station, said inner mounting stations being located radially proximate to said rotational axis relative to said middle and outer mounting stations, said outer mounting stations being located radially remote from said rotational axis relative to said inner and middle mounting stations,
   a side-cutter disposed on each of said left and right pads, each said side-cutter operatively facing into the cutting direction, and
   the axial distance between said left and right pads of said inner mounting stations being greater than the axial distance between said left and right pads of said middle mounting stations, the axial distance between said left and right pads of said middle mounting stations being greater than the axial distance between said left and right pads of said outer mounting stations, whereby the axial distance differences of said inner and middle and outer mounting stations enable better management of cutting forces in a side cutting mode resulting in smoother operation.

2. The wheel of claim 1, wherein each said mounting station is an integral, substantially monolithic formation with said wheel body.

3. The wheel of claim 1, wherein each of the bilateral mounting station has a left side face and a right side face and wherein said left side face and said right side face are each generally planar.

4. The wheel of claim 3, wherein said left side face is disposed parallel to said right side face, and said left and right sides each generally perpendicular to said rotational axis.

5. The wheel of claim 4, wherein said left and right sides are each generally annular, said wheel body having a generally circular periphery, and said wheel body having a central hub opening centered about said rotational axis.

6. The wheel of claim 1, wherein said plurality of segments comprises at least three segments.

7. The wheel of claim 6, wherein said plurality of segments are each of generally equal angular measure.

8. The wheel of claim 1, wherein said left and right pads are each generally planar.

9. The wheel of claim 8, wherein said left pads are disposed parallel to said right pads.

10. The wheel of claim 9, wherein said left and right pads are each generally perpendicular to said rotational axis.

11. The wheel of claim 8, wherein each said mounting station includes at least one pass-through aperture extending between and opening into said respective left and right pads.

12. The wheel of claim 1, wherein said inner mounting station within each said spiral cluster is located angularly rearwardly of the cutting direction relative to said middle and outer mounting stations, and said outer mounting station within each said spiral cluster is located angularly forwardly in the cutting direction relative to said inner and middle mounting stations.

13. The assembly of claim 1, further including at least one plunge cutter disposed within each said spiral cluster.

14. The assembly of claim 13, wherein said wheel body has an outer periphery, said plunge-cutter has a cutting tip at least partially overlying said periphery of said wheel body, said plunge-cutter disposed angularly in-between said middle and outer mounting stations within each said spiral cluster.

15. The assembly of claim 1, wherein each said side-cutter includes a tool holder configured for direct attachment to said associated mounting station.

16. The assembly of claim 15, wherein each said side-cutter includes a cutting tip supported in the respective said tool holder.

17. The assembly of claim 16, wherein said cutting tip is generally circular.

18. The assembly of claim 16, wherein each said mounting station includes at least one pass-through aperture extending between and opening into said respective left and right pads and further including a threaded fastener disposed in said pass-through apertures, said threaded fastener operatively engaging said respective tool holders on said opposing left and right pads of each said mounting station.

19. A stump grinding wheel assembly of the type rotated at high speed to grind away an earth-rooted tree stump, said assembly comprising:
  a wheel body configured for power-driven rotation in a cutting direction about a rotational axis passing centrally therethrough, said cutting direction defining a forward angular direction, said wheel body having a generally annular left side and a generally annular right side, said left and right sides being generally planar and each generally perpendicular to said rotational axis, said wheel body having a periphery,
  said wheel body being parsable into a plurality of segments radiating from said rotational axis wherein each segment occupies a predetermined angular portion of annular geometry, wherein the angular sum of said segments equals 360 degrees, wherein said plurality of segments comprises at least three segments, wherein said plurality of segments are each of generally equal angular measure,
  a plurality of bilateral mounting stations distributed about said wheel body, wherein each said mounting station is an integral monolithic formation with said wheel body, each said mounting station having a left pad on said left side and an axially opposite right pad on said right side, said left and right pads being generally planar and generally perpendicular to said rotational axis,
  said plurality of mounting stations being arranged into a plurality of spiral clusters equal in number to said plurality of segments, each said spiral cluster being disposed in a respective one of said segments of said wheel body, each said spiral cluster comprising an inner mounting station and at least one middle mounting station and an outer mounting station, said inner mounting stations being located radially proximate to said rotational axis relative to said middle and outer mounting stations, said outer mounting stations being located radially remote from said rotational axis relative to said inner and middle mounting stations, said inner mounting station within each said spiral cluster being located angularly rearwardly of the cutting direction relative to said middle and outer mounting stations, said outer mounting station within each said spiral cluster being located angularly forwardly in the cutting direction relative to said inner and middle mounting stations, the axial distance between said left and right pads of said inner mounting stations being greater than the axial distance between said left and right pads of said middle mounting stations, the axial distance between said left and right pads of said middle mounting stations being greater than the axial distance between said left and right pads of said outer mounting stations,
  a side-cutter disposed on each of said left and right pads, each said side-cutter operatively facing into the cutting direction, each said side-cutter including a tool holder configured for direct attachment to said associated mounting station, each said side-cutter including a cutting tip supported in the respective said tool holder, said cutting tip being generally circular,
  at least one plunge cutter disposed within each said spiral cluster, said plunge-cutter having a cutting tip at least partially overlying said periphery of said wheel body.

* * * * *